UNITED STATES PATENT OFFICE.

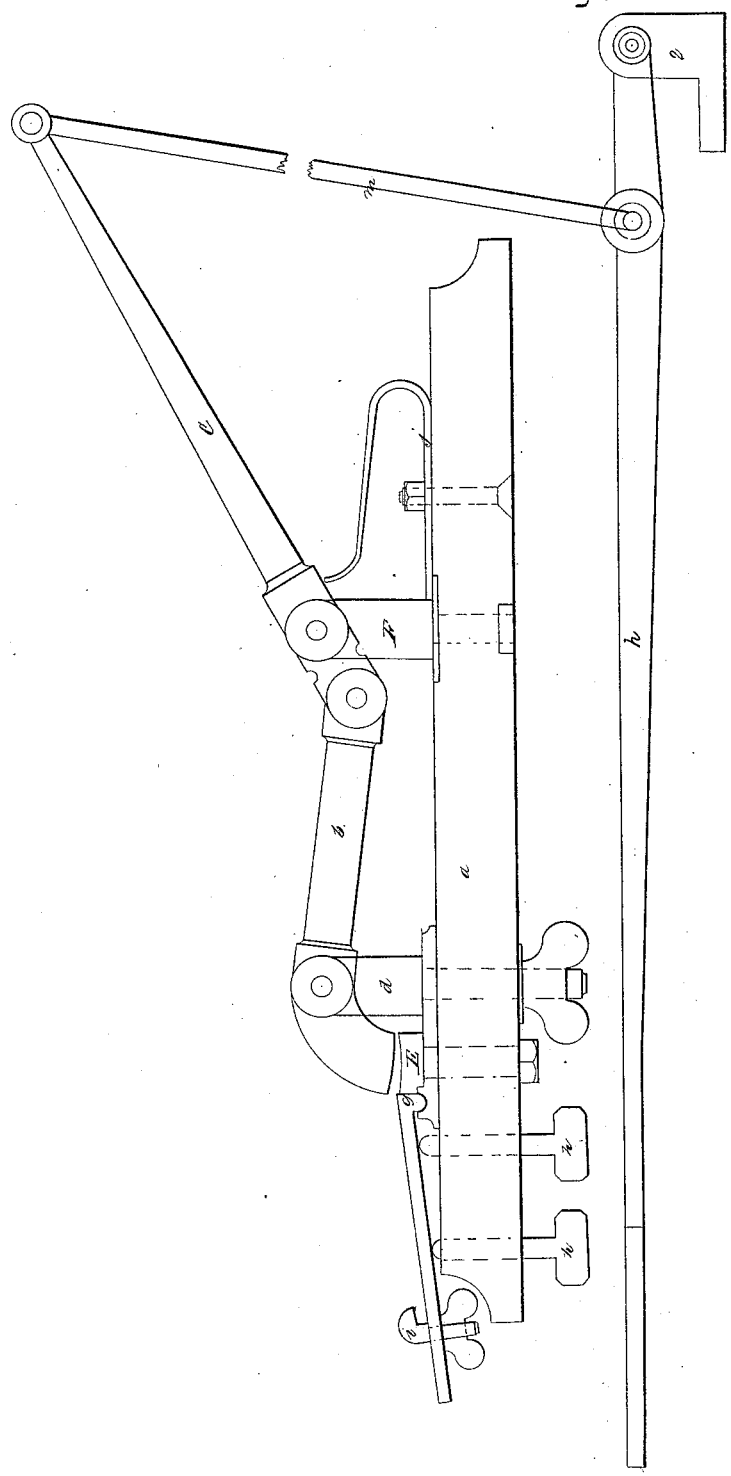

EDWARD S. WATSON, OF CHENANGO FORKS, NEW YORK.

SAW-SET.

Specification of Letters Patent No. 14,936, dated May 20, 1856.

*To all whom it may concern:*

Be it known that I, EDWARD S. WATSON, of Chenango Forks, in the county of Broome, in the State of New York, have invented a new and Improved Mode or a Machine for Setting Saw-Teeth of All Kinds; and I do hereby declare that the following is a full and exact description thereof, reference being had to the accompanying drawing and to the letters of reference marked thereon.

The nature of my invention consists in a concave die, a convex tooth cap to fit the die, connected with an adjusting post, so as to fit the thickness of any saw plate, and to set the teeth at the base, and draw them from head to point, in such a form, as to prevent the teeth from breaking, and from springing back, when one side of the tooth is harder than the other, and to set the front side of the teeth the most, so as to avoid all roughness and racking, when the saw is drawn back, and preventing evils which no other saw set does.

To enable others skilled in the art to make and use my invention, I proceed to describe its construction and operation.

A is the bead plate usually made of wood, which holds the other parts of the machine.

E is the concave die, set in the working end of the bead plate, close to the groove in the ends of the bead plate, said groove is for the bead on the sliding, and stationary plates to lock in.

B is the convex tooth cap and lever, secured with a pivot in the adjusting post.

D is the adjusting post which stands in the bead plate with a screw on the under side, to lower or elevate the post according to the thickness of saw plates.

C is the hand lever which operates the machine.

F is the main fulcrum post.

The two levers B and C are connected by a joint.

G is the saw table upon which the saw is secured while being set, and moves at right angles with the bead plate, when setting mechanics' saws, and stationary for circular and mill saws. H, H, are four set thumb screws, to adjust the said table, to give the proper set to the teeth, setting the front side of the teeth the most. By having the side adjusting screws under the bed for the saw-blade, I am enabled, in conjunction with the central tightening screw, to give to the bed an oblique inclination, *i. e.*, inclining the one side of the bed higher or lower than the other side, which allows the setting faces of the set to give a twisting or curved face to the tooth of the saw.

I is a set dog to secure the back of mill saws, and moves in a slant in the mill saw table.

J is a spring which carries the hand lever, and clears the die.

K is a lever used when desirable.

L is the floor stand, which holds the end of paddle.

M is a pitman used in connection with the lever and paddle, when the set is used by the foot.

What I claim as of my invention and desire to secure by Letters Patent is—

The arrangement of the side set-screws under the bed for the saw-plate and the central adjusting screw for giving to the bed and the saw-blade the inclined position and thus allowing the tooth of the saw to have given to it the curved or twisted face as herein set forth.

EDWARD S. WATSON.

Witnesses:
ANDREW N. COLE,
E. S. AVERY.